United States Patent [19]

Vogelsberg et al.

[11] 4,328,664
[45] May 11, 1982

[54] APPARATUS FOR THE SZ-TWISTING OF STRANDING ELEMENTS OF ELECTRIC OR OPTICAL CABLES AND LINES

[75] Inventors: Dieter Vogelsberg, Coburg; Klaus Koch, Berlin, both of Fed. Rep. of Germany

[73] Assignee: Siemens Aktiengesellschaft, Munich, Fed. Rep. of Germany

[21] Appl. No.: 228,736

[22] Filed: Jan. 27, 1981

Related U.S. Application Data

[63] Continuation of Ser. No. 59,213, Jul. 20, 1979, abandoned.

[30] Foreign Application Priority Data

Jul. 28, 1978 [DE] Fed. Rep. of Germany ....... 2833201

[51] Int. Cl.$^3$ .......................................... H01B 13/04
[52] U.S. Cl. ....................................... 57/293; 57/294
[58] Field of Search ................................. 57/293, 294

[56] References Cited

U.S. PATENT DOCUMENTS

| | | | |
|---|---|---|---|
| 3,043,084 | 7/1962 | Smith | 57/293 |
| 3,373,549 | 3/1968 | Shaw | 57/294 |
| 3,407,588 | 10/1968 | Feese | 57/294 X |
| 3,491,525 | 1/1970 | Sugi | 57/294 |
| 3,762,142 | 10/1973 | Rasmussen | 57/293 X |
| 3,808,787 | 5/1974 | Vogelsberg | 57/294 |
| 4,056,925 | 11/1977 | Vogelsberg | 57/294 |
| 4,196,576 | 4/1980 | Vogelsberg | 57/293 X |

*Primary Examiner*—Donald Watkins
*Attorney, Agent, or Firm*—Kenyon & Kenyon

[57] ABSTRACT

SZ twisting of stranding elements of electric or optical cables and lines is accomplished by means of twisting apparatus which consists of a twisting section defined by a first and a second twisting point within which at least one twisting head is arranged. The twisting head includes at least one deflection pulley or deflection roller which is stationary in the circumferential direction of the material to be twisted and with which the material to be twisted is in contact over part of the circumference. The axis of the deflection pulley or deflection roller is set at an angle to the axis of the tautly conducted material to be twisted. The inclination of this axis can be varied at intervals and the location of the deflection pulley or deflection roller relative to the material to be twisted can be changed at intervals. By setting the axis at an angle, a force component in the tangential direction which leads to a twisting of the material to be twisted, is exerted on the material to be twisted. The twisting head is designed so that the twisting takes place in always one direction, but with different magnitude at intervals. The super-position of two twists at the entrance and the exit of the twisting section leads to a resultant SZ twist.

17 Claims, 12 Drawing Figures

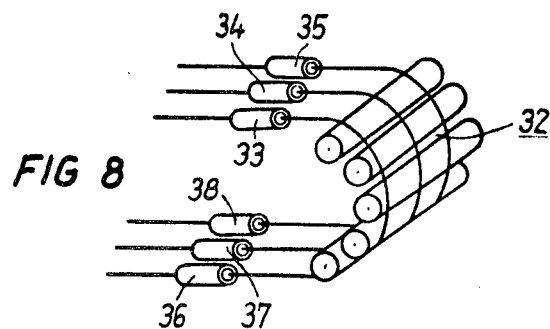
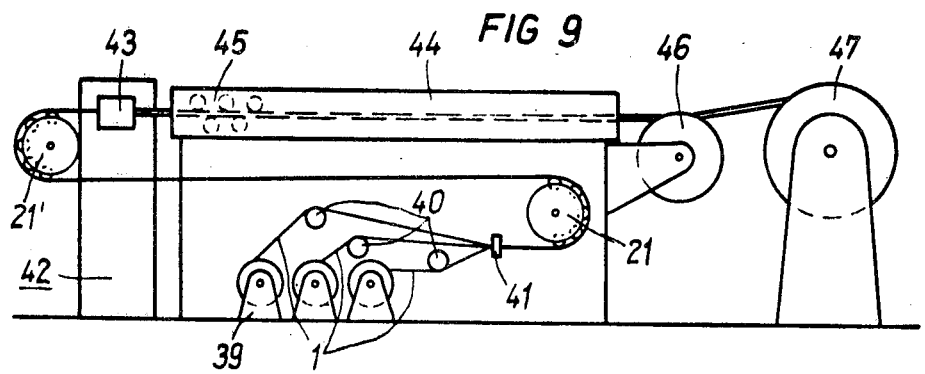
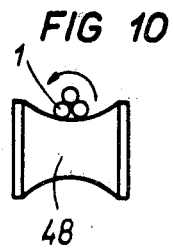
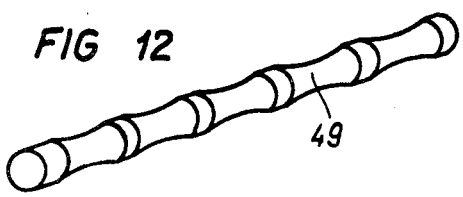
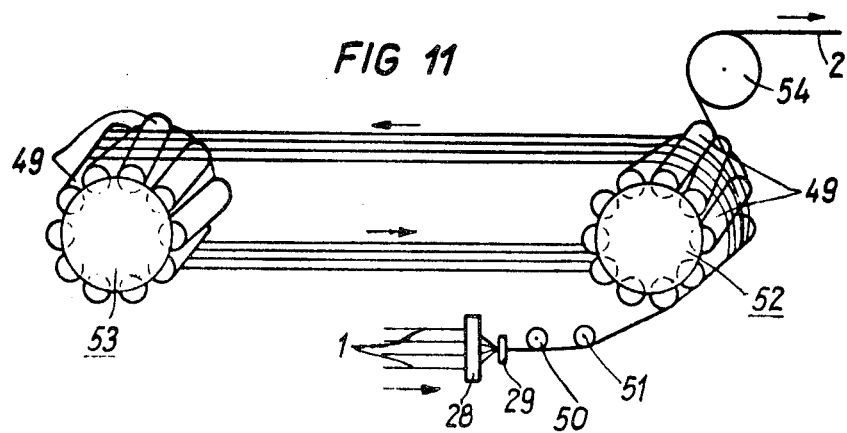

APPARATUS FOR THE SZ-TWISTING OF STRANDING ELEMENTS OF ELECTRIC OR OPTICAL CABLES AND LINES

This is a continuation, of application Ser. NO. 59,213 filed July 20, 1979, abandoned.

BACKGROUND OF THE INVENTION

This invention relates to the field of SZ twisting of stranding elements of electric or optical cables and lines in general and more particular to the mechanical design of appropriate twisting tools in view of minimizing the rotating masses as well as the physical extent of the reversal points of the twist direction in the SZ twisted material.

For the SZ twisting of electric cables and lines, apparatus which consists of a first and a second torsion stop, twisting point or twisting closer and at least one twisting head which is arranged between the torsion stops can be used. The stranding elements to be twisted are fed from stationary supply devices being drawn through the apparatus by a pull-off and take-up device. SZ twisting has the advantage that it can be combined with other operations, for instance, with the extrusion of the conductor insulation, with the twisting of several SZ twisted stranding units, or with the extrusion of an outer jacket.

The tools used for SZ twisting heretofore consist as a rule of twisting heads which rotate about the twisting axis and grip the material to be twisted from the outside tensionally in the circumferentially direction. Either the rotary motion of the twisting heads is changed at intervals (DE-OS No. 15 15 730, DE-AS No. 17 65 452, DE-AS No. 22 30 972), or the distance between the twisting heads and/or the torsion stops or twisting closers is alternatingly increased and decreased continuously. (DE-AS No. 21 38 239, DE-AS No. 22 32 329).

In a known apparatus different therefrom for the SZ twisting of stranding elements of electric cables, a pair of rollers, which is stationary relative to the twisting axis, is used as the twisting tool or part of a twisting tool. The driven rollers are arranged on both sides of the material to be twisted, which is conducted in a straight line, and exert a longitudinal as well as a rotary motion on the material to be twisted because their axes are arranged inclined to the axis of the material to be twisted. For the purpose of SZ twisting several conductors, the inclination of the roller axes can be changed, i.e., the angle enclosed between the crossed roller axes changes its sign (DE-OS No. 25 08 385). In these known machines, a difficulty arises in that, during the initial SZ torsioning or the SZ twisting, reversals of the twist or torsion direction occur, which can easily untwist under the influence of the tension. Otherwise, when twisting several stranding elements the danger of the individual stranding elements coming to lie simply parallel between the pairs of rollers at the reversal points of the twist direction exists and in which case the elements are only shifted back and forth in this manner without resulting in the intended twisting effect.

Twisting machines are also known, in which the stranding elements are twisted in a double lay by means of a twisting yoke, and in which the material to be twisted is deflected within the twisting yoke by an angle of approximately 180° by means of a device which consists of several rollers or roller pairs which are arranged in tandem in the line of the twisting yoke and are set at an angle to the travel direction of the material to be twisted (DE-AS No. 15 10 091). Similar deflecting devices can be used, in twisting machines in which the stranding elements are rotated backwards while being led to the twisting closer, to ensure that the back rotation can propagate into the twisting closer even through a deflecting device provided for the stranding elements (DE-AS No. 15 10 136=U.S. Pat. No. 3,196,601; DE-OS No. 2734398).

SUMMARY OF THE INVENTION

It is an object of the present invention to provide, for the SZ twisting of stranding elements of electric or optical cables and lines, an apparatus which has no parts rotating about the twisting axis, is of simple design and ensures that reversal points of the twist direction as short as possible are obtained in the processed stranding material.

To solve this problem, the present invention starts out from apparatus which consists of stationary supply devices for the elements to be stranded, a twisting device and a pull-off and take-up device. A twisting section which consists of a first and second twisting point or twisting closer and of at least one twisting head which is arranged between the two twisting points and which grips and twists the stranding elements collated in a strand is provided as the twisting device. According to the present invention, the twisting head consists of at least one deflection pulley or deflection roller which is standing still in the circumferential direction of the material to be twisted and with which the material to be twisted is in contact at least over part of the circumference, and the axis of which is set an angle to the axis of the material to be twisted, which is supported in taut conditions, and closes an acute angle with the latter. Either the inclination of the axis of the deflection pulley or deflection roller can be changed at intervals in an angular range from 0° to 90°, or the location of the deflection pulley or deflection roller relative to the material to be twisted or the location of the material to be twisted relative to the deflection pulley or deflection roller can be changed at intervals on or transversely to the travel axis of the material to be twisted.

In an SZ twisting apparatus designed in this manner, the necessary tensional connection between the material to be twisted and the twisting tool is obtained from the tension exerted on the material to be twisted and from at least one deflection of the material to be twisted. By the inclination of the twisting tool relative to the travel axis of the material to be twisted, a force component in a tangential direction is exerted on the latter. This leads to the twisting of the material. It is essential for the present invention that the tangential force component can be changed at intervals, optionally together with an axial force component; the resulting SZ twisting of the material to be twisted is then obtained from the tangential force component which changes at intervals. It is furthermore essential that only the amplitude and not the direction of the tangential force amplitude is variable; this ensures that, in the region of the twisting section, the material to be twisted is always twisted in the same direction, so that the reversal points of the twist direction are formed only at the exit of the twisting section, i.e., when the second twisting point is traversed. In the region of the twisting section one therefore obtains, in the material to be twisted, only sections in which the magnitude of the length of lay of the twisting changes but not its direction. Such sections have much less of a tendency to untwist under the influence of tensile stresses.

Due to the fact that only the magnitude, but not the direction of the tangential force component is variable, it is further assured that the material to be twisted always enters the twisting tool in a twisted condition, so that the forces exerted tangentially by the twisting tool already act on an existing stranded assembly. This prevents the stranding elements of the material to be twisted from coming to lie parallel on the deflection roller(s) or deflection pulley(s) of the twisting tool and from being shifted only axially on the deflection pulleys or deflection rollers by the tangential force component.

The change of the tangential force component of the twisting tool can be accomplished either by changing the inclined position of the axis of the deflection pulley or deflection roller or by changing the location of the deflection pulley or deflection roller relative to the material to be twisted, or the location of the material to be twisted relative to the deflection pulley or deflection roller. The change of the location may be either an axial shift of the deflection pulley or the deflection roller, through which the location of the material to be twisted is fixed by suitable guide nipples, or conversely, a lateral shift of the material to be twisted by means of suitable guide nipples; however, the change of the location can also be accomplished by a continuous shift of the twisting tool in the lengthwise direction of the material to be twisted. In all cases, there is superimposed, on the tangential force component present in a given position of the twisting tool, an additional tangential force component which leads to an increase or decrease of the original tangential force component, depending on its sign. To this end, the change of the inclination of the deflection pulleys or deflection rollers must take place suddenly at intervals, while the change of the location of the deflection pulleys or deflection rollers takes place uniformly by sections in the one and in the other direction.

In order to produce a sufficiently large friction between the deflection pulleys or deflection rollers and the material to be twisted with the new twisting tool, it is advantageous if the twisting head consists of several deflection pulleys or deflection rollers. To this end, for instance, at least three deflection pulleys or deflection rollers can be arranged at a distance from each other and in at least two different planes. The material to be twisted is then brought sequentially first around the one, then around the second and, finally, around the third deflection pulley or deflection roller and is deflected by them. This arrangement provides the possibility of making the twisting section essentially in a straight line.

If several deflection pulleys or deflection rollers are arranged in different planes, these planes may or may not be parallel to each other. The arrangement with planes which are not parallel causes succeeding deflection pulleys to exert a different torsion on the material to be twisted.

A variant which is particularly practical because it can be expanded in different directions, however, includes several deflection pulleys or deflection rollers arranged on a pitch circle, so that, overall, the material to be twisted deflected through a larger angle. It is particularly advantageous if the material to be twisted makes contact with the deflection pulleys or deflection rollers over an angle of about 180° or 360°. This provides the possibility of arranging the SZ twisting section parallel to an insulating section or a water cooling section, or parallel to a second twisting stage. Furthermore, the possibility of conducting the material to be twisted in several turns inside the twisting device proper and to thereby give the twisting section maximum storage capacity is provided. This possibility exists particularly if two twisting heads are provided within the twisting section, of which the one is arranged immediately after the first twisting point and the other one immediately ahead of the second twisting point.

Regarding the practical embodiment of a twisting head with several deflection pulleys or deflection rollers arranged on a circular arc, it is advantageous to arrange the deflection pulleys or deflection rollers on a cylindrical support. The arrangement can be such that the deflection pulleys or deflection rollers are rotatably supported in two circular rings which contain the bearings and can either be rotated independently of each other for changing the inclination of the axes of the deflection pulleys or deflection rollers, or can be rotated together about their axis for the purpose of changing the location of the deflection pulleys or deflection rollers. If two twisting heads are provided within the twisting section, it is also possible to make the mutual distance of the twisting head variable, possibly together with the associated twisting points, like a "breathing accumulator".

In order to maximize the storage capacity of the twisting section if two twisting heads are used within the twisting section, it is advisable if the material to be twisted rests on the twisting heads in coil-fashion in several turns. In that case, the deflection pulleys or deflection rollers are made particularly long, so that several turns can be arranged side by side on a deflection pulley or deflection roller. In general, but specifically also for this case, it is advantageous to give the deflection pulleys or deflection rollers a concave profile, so that each turn is guided in a separate profile of the deflection pulley or deflection roller. The concave profiles of the deflection pulleys or deflection rollers, incidentally, favor the transformation of the tangential force component into the desired twist of the material to be twisted.

Maximized storage capacity of the twisting section can also be utilized in such a manner that a single strand of the material to be twisted is not conducted multiply via two twisting heads but several strands of material to be twisted are processed, within the twisting section, parallel to each other, by assigning to the twisting heads several respective first and second twisting points or twisting closers for feeding in and taking out several strands of material to be twisted in parallel.

If, in the interest of maximum storage capacity of the twisting section, the latter consists of two twisting heads, the distance between which is more than 10 m, it is advisable to arrange, between the two twisting heads, additional twisting heads, by means of which the rotary motion of the material to be twisted is maintained in the region between the twisting heads. In principle, twisting heads rotating about the twisting axis can be used for this purpose; in view of the twisting principle on which the invention is based, however, twisting heads, each of which consist of respective pairs of pulleys or rollers, between which the material to be twisted runs and the axes of which are set at an angle to the axis of the material to be twisted and the inclination of which is variable are recommended. Especially in twisting sections with so large a storage capacity, it is advisable, in view of the large amount of stored material to be twisted, that one or more of the deflection pulleys or deflection rollers of the twisting heads can be driven directly or via a slip clutch.

BRIEF DESCRIPTION OF THE DRAWINGS

FIG. 8 is an additional view showing the manner in which several strands of material are lead over apparatus such as that shown in FIGS. 6 and 7.

FIG. 9 illustrates apparatus for twisting three conductors into a stranded unit and subsequently jacketing the twisted conductors.

FIG. 10 illustrates a concave roll or pulley which can be used to enhance twisting effect.

FIG. 11 illustrates a further embodiment of twisting apparatus according to the present invention.

FIG. 12 illustrates a roll having a plurality of concave areas similar to that shown for the single roller or pulley of FIG. 10.

DETAILED DESCRIPTION OF THE INVENTION

Figure 1:
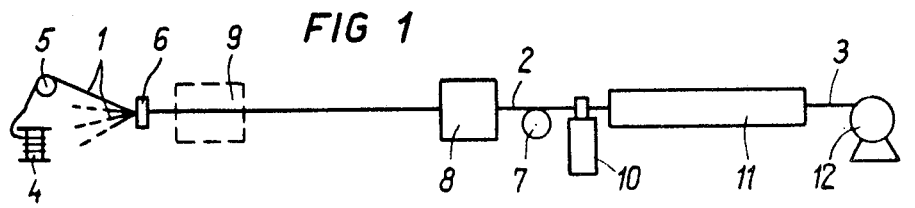
FIG. 1 is a schematic diagram of twisting apparatus according to the present invention.

FIG. 1 shows apparatus for SZ twisting four conductors 1 into a stranded unit 2 and for subsequently applying an outer jacket by means of an extruder 10 followed by a water cooling section 11 and thus, for manufacturing a line or a cable 3, which is taken up by the pull-off and winding device 12.

The apparatus proper for SZ twisting the conductors consists of the twisting closer 6, into which the conductors enter from supply devices 4 via deflection rolls 5; of the second twisting point in the form of a deflection roller 7; and of at least one twisting head 8 which is arranged immediately ahead of the second twisting point. Optionally, a second twisting head 9 is arranged between the two twisting points immediately after the first twisting point.

Figure 2:
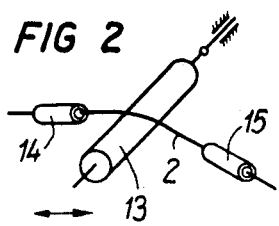
FIG. 2-4 are prespective schematic diagrams illustrating different ways in which movement of the deflection pulley or roller of the apparatus of FIG. 1 can be moved to carry out the requiring twisting.
Figure 3:
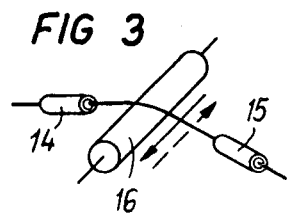
Figure 4:
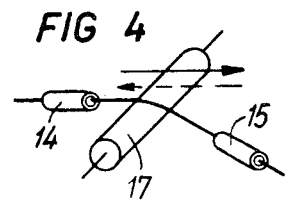

The twisting head 8 or each of the twisting heads 8 and 9 provided for the SZ twisting consists, in the simplest case, according to the illustrations in FIGS. 2 to 4, of a deflection pulley or deflection roller 13, the axis of which is set in an angle to the travel axis of the material to be twisted 2. Before and after the deflection roller, the material is guided laterally by means of guide nipples 14 and 15.

Because of the inclination of the axis of the deflection roller 13 relative to the travel axis of the material to be twisted, a force component transverse to the travel direction of the material to be twisted is exerted on the material to be twisted by the deflection roller upon a longitudinal movement of the material to be twisted; this force component leads to a rotary motion of the material to be twisted, since the latter is laterally fixed by means of the guide nipples 14 and 15. This transversal component or tangential force component can be varied by changing, as shown in FIG. 2, the inclination of the axis of the deflection roller relative to the travel axis of the material to be twisted or, as shown in FIG. 3, by moving the deflection pulley or deflection roller 16 back and forth in the direction of the axis, or, according to FIG. 4, by changing the location of the deflection roller 17 in the one or the other direction or alternatingly in both directions in the longitudinal direction of the material to be twisted. Instead of the lateral shift of the deflection pulley provided in FIG. 3, a lateral shift of the material to be twisted, with the deflection pulley stationary, can also be considered.

Figure 5:
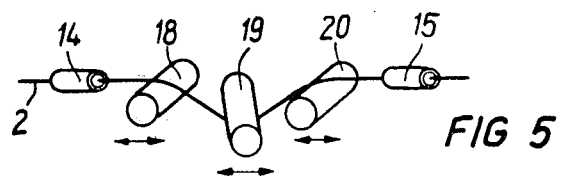
FIG. 5 shows a similar embodiment to that of FIG. 2, but utilizing a plurality of rollers.

Since relatively small forces are exerted by a single deflection pulley or deflection roller disposed transversely or tangentially to the travel axis of the material to be twisted, it is advantageous if the twisting head consists of several deflection pulleys or deflection rollers. FIG. 5 shows an embodiment for this, in which the material to be twisted is guided sequentially over three deflection rollers 18, 19 and 20 arranged at a distance from each other; the angle of inclination of the deflection rollers is variable. For lateral fixation of the material to be twisted, two guide nipples 14 and 15 are likewise associated with the twisting head in this embodiment.

Figure 6:
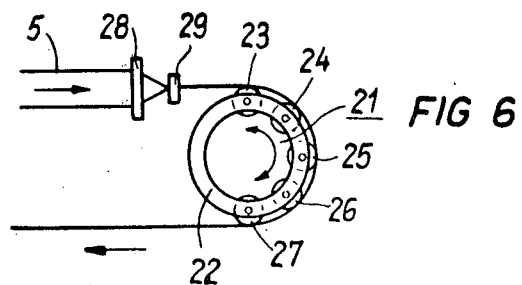
FIG. 6 is a schematic elevation view of a twisting head with five deflection rollers rotably supported in circular rings for use in the apparatus of FIG. 1.

A particularly simple and therefore particularly practical embodiment of a twisting head from a design standpoint is shown in FIG. 6. The twisting head 21 consists of five deflection rollers 23 to 27, which are rotatably supported at both ends with their axles jointly in respective circular rings 22. The twisting head as a whole is stationary. However, one or both circular rings are rotated about their axis through a certain angle at time intervals, which are characteristic for the SZ twisting, in such a manner that the individual deflection rollers change their angular position suddenly relative to the material to be twisted, which is guided over the deflection rollers. Since in this process only very small masses need to be accelerated, the change of the angular position can take place in a very short time. In the twisting head shown in FIG. 6, the stranding elements are fed to the twisting head via the hole disc 28 and the twisting closer 29.

Figure 7:
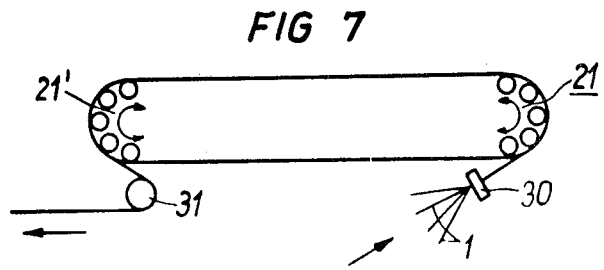
FIG. 7 is a schematic diagram illustrating how two arrangements such at that of FIG. 6 can be used in a twisting device.

Two twisting heads 21 designed in accordance with FIG. 6 can also form an SZ twisting device together, the one twisting head being arranged at the entrance and the other one at the exit of the SZ twisting device. FIG. 7 shows an embodiment of this nature, in which the conductors 1 are fed to the twisting head 21 via the twisting closer 30 and in which the material to be twisted leaves the twisting head 21' via the deflection roller 31 forming the second twisting point. Such an embodiment of an SZ twisting device provides, in particular, the possibility for the material to be twisted to be conducted within the SZ twisting device in several turns, whereby relatively large storage lengths can be realized in spite of a limited overall length of the SZ twisting apparatus. One can then proceed so that, for each deflection of the material to be twisted by 180°, separate guide rollers and thereby, separate twisting heads are provided within the accumulator; however, it is particularly advantageous to always lead the turns of the material to be twisted over the same twisting head, as is schematically shown in FIG. 8 for the twisting head 32. Guide nipples 33 to 35 and 36 to 38 insure that the parallel strands of the material to be twisted do not tumble over each other when the machine is standing still. With a small amount of mechanical means, storage lengths of several hundred meters can thus be obtained in several loops. Similarly it is possible to twist several different strands of material to be twisted by means of two twisting heads according to FIG. 7.

Through suitable design of the deflection pulleys or deflection rollers, the twisting effect obtained by the inclined position of the deflection pulleys or deflection rollers can be enhanced. Examples of this are shown in FIGS. 10 and 12. In FIG. 10, a deflection pulley which has a concave profile or taper is shown. This favors the rolling of the conductors 1 on the deflection pulley. FIG. 12 shows a deflection roller 49 which is provided for guiding several turns of the same material to be twisted or several turns of different strands of material to be twisted, and which has several concave diameter reductions side by side.

The apparatus shown in FIG. 9 serves for SZ twisting of three conductors 1 into a stranding unit and for subsequently jacketing the SZ twisting conductors. To this end, the conductors 1 run off from supply device 39 and are fed to the twisting closer 41 via hysteresis brakes 40, by means of which the conductors are braked uniformly. From the twisting closer, they run onto the deflection pulleys of the twisting head 21, around which the material to be twisted is looped about 180°. A second twisting head 21' is arranged immediately adhead of an extruder 42, in the extrusion head 43 of which twisted conductors are jacketed. The extruder 42 is followed by a water cooling section 44, in the entrance region of which a torsion stop 45 is arranged which forms the second twisting point for the twisting head 21'. The pull-off device 46 is arranged at the end of the water cooling section, and is followed by the wind-up device 47.

The twisting heads 21 and 21' are nonrotating inclined pulley twisters, each of which contains five small guide pulleys or guide rollers arranged at an angle to the pull-off direction of the material to be twisted. Their angular position can be changed together between two fixed values by means of a suitable support plate. This can be done, for instance, by an electromagnet, the excitation of which is switched on and off in dependence on the running time of the material to be twisted from the twisting head 21 to the twisting head 21'.

The deflection pulleys of the twisting heads 21 and 21' are of concave shape and are not driven. Due to the tension forces supplied by the pull-off device 46 and taken up by the hysteresis brakes 40, a contact pressure of the conductors 1 on the inclined guide pulleys of the twisting heads is obtained. The contact pressure and the inclined position of the deflection pulleys cause a transversal motion of the conductors on the deflection pulleys taken along by the conductors. The concave shape of the deflection pulleys insures that a conductor located at a flange flips over the middle conductor and the conductors thus continuously wind around each other. When running through the stationary twisting head 21 or 21', respectively, the conductors are therefore distributed in the same manner as they would be by means of a rotating twisting head of conventional design.

The angle which the axes of the deflection pulleys enclose with the travel axis of the material to be twisted, is always larger or smaller than 90° respectively. This ensures that the conductors 1, when they run onto the twisting head 21, are always twisted together in the same direction.

After leaving the twisting head 21, the material to be twisted runs, for instance, over a distance of 10 m free in air and finally reaches the second twisting head 21', which is identical to the twisting head 21. The angular position of the deflection pulleys of the twisting head 21 can be changed synchronously with the deflection pulleys of the twisting head 21'. The condition of torsion of the material to be twisted therefore remains unchanged between the two twisting heads.

The embodiment of an SZ twisting apparatus shown in FIG. 11 also serves for twisting conductors 1 to form a stranded unit 2. To this end, the conductors are fed via a hole plate 28 to a first twisting closer 29 and from there, via guide pulleys 50 and 51, to the two twisting heads 52 and 53. After leaving the twisting heads, the material to be twisted is conducted over a deflection pulley 54, which represents at the same time the second twisting point.

The twisting heads 52 and 53 likewise consist of several deflection rollers 49, which in this embodiment are distributed over the entire circumference of a support. The cage-like support executes a rotary motion about its own axis, which is changed at intervals depending on the size and/or direction. This means that the deflection rollers 49 change their physical position relative to the material to be twisted in the longitudinal direction. The cage-like supports can always rotate in the same direction but with changing speed of rotation; one speed can also be zero. However, their direction of rotation can also change. If the rotary motion of the twisting heads is in the pull-off direction of the material to be twisted, it must be ensured, however, that the circumferential velocity of the twisting heads is always less than the pull-off velocity of the material to be twisted, so that no reversal points of the twist direction of the material to be twisted result within the SZ-twisting apparatus.

In the embodiments described in connection with FIGS. 7, 9 and 11, in which the SZ twisting apparatus always contains two twisting heads, the change in the twisting of the material to be twisted required for SZ twisting can also be achieved if the mutual distance of the two twisting heads and, if applicable, of the associated twisting closers and guide devices, can be continously decreased and increased at intervals.

The twisting tools and machines described can be used in the same manner for the pre-torsioning of a single conductor, as is customary in the twisting of conductors for communication cables, if only a single conductor is fed to the respective device instead of several conductors.

As used in the claims herein, twisting point generically refers to a twisting point or twisting closer. The term cyclindrical deflection means is a generic term which includes a deflection pulley and a deflection roller.

What is claimed is:
1. In the apparatus for the SZ-twisting of material comprising at least one element of an electrical or optical cable or line, including at least one stationary supply device for the material, a twisting device, a pull-off and wind-up device, and a twisting section which comprises a first and a second twisting point and at least one twisting head arranged between the two twisting points, which grips and twists the at least one element, the improvement comprising:
 (a) the twisting head comprising at least one cylindrical deflection means which is stationary in the circumferential direction of the material to be twisted and with which the material to be twisted is in contact at least over part of the circumference, and the axis of which is set at an angle to the axis of the tautly conducted materials to be twisted and encloses with the latter an acute angle; and (b) means for changing the relative spatial relationship between the deflection means and material to be twisted at intervals.

2. Apparatus according to claim 1, wherein said means for changing comprise means for changing the inclination of the axis of the deflection means, at intervals, in an angular range 0° to 90°.

3. Apparatus according to claim 2, wherein said twisting head comprises at least three deflection means arranged at a distance from each other and in at least two different planes.

4. Apparatus according to claim 1, wherein said means for changing comprise means for changing the location of the deflection means relative to the material to be twisted.

5. Apparatus according to claim 1, wherein said means for changing comprise means for changing the location of the material to be twisted relative to the deflection means.

6. Apparatus according to claim 5, wherein said means for changing comprise means for changing the location of the deflection means relative to the material to be twisted in the direction of the travel axis of the material to be twisted.

7. Apparatus according to claim 6, wherein all deflection means are arranged on a pitch circle.

8. Apparatus according to claim 7, wherein the material to be twisted makes contact on the deflection means of the twisting head over an angle of about 180° to 360°.

9. Apparatus according to claim 7 wherein the deflection means are disposed on a cylindrical support.

10. Apparatus according to claim 9, wherein said support is mounted for rotation about its axis with varying speed.

11. Apparatus according to claim 6 and further including a guide nipple for the material to be twisted associated with each twisting head on at least one side.

12. Apparatus according to claim 8 wherein two twisting heads are provided and wherein the material to be twisted makes contact on the twisting heads helically in several turns.

13. Apparatus according to claim 8 wherein two twisting heads are provided and wherein the distance of the twisting heads from each other is variable.

14. Apparatus according to claim 6 wherein said deflection means have a multiple grooved profile.

15. Apparatus according to claim 6 wherein two twisting heads are provided and wherein first and second parallel twisting points are associated with the respective twisting heads for feeding in and taking several strands of material to be twisted in parallel.

16. Apparatus according to claim 15 wherein said two twisting heads are spaced by distance of more than 10 m and wherein additional twisting heads are arranged between said two twisting heads for maintaining the rotary motion of the material to be twisted.

17. Apparatus according to claim 6 wherein at least one deflection means of a twisting head is adapted to be driven directly or via a slip clutch.

* * * * *